(12) United States Patent
Pitzer et al.

(10) Patent No.: US 10,667,890 B2
(45) Date of Patent: Jun. 2, 2020

(54) TEETH CLEANING DEVICE

(71) Applicant: BLBR GmbH, Grünwald (DE)

(72) Inventors: Ernst Martin Wilhelm Pitzer, Pohlheim (DE); Michael Erich Keiner, Braunfels (DE)

(73) Assignee: BLBR GMBH, Grünwald (DE)

( * ) Notice: Subject to any disclaimer, the term of this patent is extended or adjusted under 35 U.S.C. 154(b) by 297 days.

(21) Appl. No.: 16/071,589

(22) PCT Filed: Jun. 16, 2016

(86) PCT No.: PCT/EP2016/063908
§ 371 (c)(1),
(2) Date: Jul. 20, 2018

(87) PCT Pub. No.: WO2016/202928
PCT Pub. Date: Dec. 22, 2016

(65) Prior Publication Data
US 2019/0015181 A1    Jan. 17, 2019

(30) Foreign Application Priority Data

Jun. 19, 2015   (DE) .......................... 10 2015 109 891

(51) Int. Cl.
*A61C 17/22*  (2006.01)
*A61C 17/34*  (2006.01)
(Continued)

(52) U.S. Cl.
CPC .......... *A61C 17/221* (2013.01); *A61C 9/0046* (2013.01); *A61C 17/20* (2013.01);
(Continued)

(58) Field of Classification Search
CPC ..... A61C 17/20; A61C 17/221; A61C 17/222; A61C 17/228; A61C 17/3481;
(Continued)

(56) References Cited

U.S. PATENT DOCUMENTS

2009/0276972 A1\* 11/2009 Dugan .................... A46B 7/00
15/167.2
2014/0272761 A1   9/2014 Lowe et al.
(Continued)

FOREIGN PATENT DOCUMENTS

DE   202009008362 U1 \* 10/2009   .......... A61C 9/0006
DE   202009008362 U1    10/2009
(Continued)

OTHER PUBLICATIONS

Fenny—"FFF vs SLA vs SLS: 3D Printing"—Aug. 29, 2013 (Year: 2013).\*

(Continued)

*Primary Examiner* — Marc Carlson
(74) *Attorney, Agent, or Firm* — Dickinson Wright PLLC

(57) ABSTRACT

A teeth cleaning device for simultaneously cleaning multiple teeth, of a user includes a mouth insert for inserting into the mouth of the user, a plurality of cleaning structures attached to the mouth insert or integrally formed together with the mouth insert, a coupling element attached to the mouth insert; and a drive device. The drive device includes a vibration motor, which can be connected to the coupling element such that the vibration motor vibrates the mouth insert during the operation of the teeth cleaning device, and a cleaning program selection element for selecting a cleaning program that defines a vibration frequency of the vibration motor within a specified frequency range and/or a vibration amplitude of the vibration motor within a specified amplitude range. The disclosure further relates to a method for producing such a teeth cleaning device.

10 Claims, 4 Drawing Sheets

(51) Int. Cl.
- *A61C 9/00* (2006.01)
- *B29C 64/386* (2017.01)
- *B33Y 80/00* (2015.01)
- *B33Y 50/00* (2015.01)
- *A61C 17/20* (2006.01)
- *B33Y 10/00* (2015.01)
- *B29C 64/153* (2017.01)
- *B29K 21/00* (2006.01)

(52) U.S. Cl.
CPC .......... *A61C 17/222* (2013.01); *A61C 17/228* (2013.01); *A61C 17/349* (2013.01); *A61C 17/3481* (2013.01); *B29C 64/386* (2017.08); *B33Y 50/00* (2014.12); *B33Y 80/00* (2014.12); *B29C 64/153* (2017.08); *B29K 2021/00* (2013.01); *B33Y 10/00* (2014.12)

(58) Field of Classification Search
CPC ... A61C 17/349; A61C 9/0046; B29C 64/153; B29C 64/386; B29K 2021/00; B33Y 10/00; B33Y 50/00; B33Y 80/00
See application file for complete search history.

(56) References Cited

U.S. PATENT DOCUMENTS

2014/0373290 A1    12/2014   Rudolf et al.
2016/0270892 A1*   9/2016   Yoo ...................... A61C 17/222

FOREIGN PATENT DOCUMENTS

| FR | 2849591 A1 | 7/2004 |
| JP | 2012187377 A * | 10/2012 |
| JP | 2012187377 A | 10/2012 |
| WO | 2009137671 A1 | 11/2009 |
| WO | 2015003681 A1 | 1/2015 |
| WO | WO-2015003681 A1 * | 4/2015 |
| WO | 2015072676 A1 | 5/2015 |

OTHER PUBLICATIONS

WO-2015003681-A1—English Machine Translation (Year: 2015).*
DE202009008362U1—English Machine Translation (Year: 2009).*
JP-2012187377-A—English Machine Translation (Year: 2012).*
International Search Report; PCT/EP2016/063908; dated Aug. 17, 2016; 6 pages.

* cited by examiner

TEETH CLEANING DEVICE

CROSS-REFERENCE TO RELATED APPLICATIONS

The present application claims priority to PCT International Patent Application Serial No. PCT/EP2016/063908 filed Jun. 16, 2016 entitled "Teeth Cleaning Device," which claims the benefit of GB Patent Application Serial No. 10 2015 109 891.1 filed Jun. 19, 2015, the entire disclosures of the applications being considered part of the disclosure of this application and hereby incorporated by reference.

BACKGROUND OF THE INVENTION

1. Field of the Invention

The present invention relates to a teeth cleaning device for the simultaneous cleaning of a plurality of teeth, and a method for producing a teeth cleaning device of this type.

2. Description of the Prior Art

Cleaning teeth is the basis of individual prophylaxis for tooth preservation. Primary aims are the removal of bacterial plaques, such as e.g. caries or periodontitis, and the removal of food residues and foreign bodies. Secondary aims are fluoride application by means of toothpastes for increasing the resilience of the teeth, particularly the tooth enamel, to acidic metabolites of the bacteria in the oral cavity.

Various types of teeth cleaning devices are currently known and are widely used:

The most widespread and also cheapest model is the manually guided short-headed toothbrush. A few regions in the mouth can better be reached in the mouth by means of a small brush head, which is why high-quality manual toothbrushes often have a short head, medium-hard to soft plastic bristles with rounded bristle ends and an ergonomic handle, which allows reliable guidance. A flat set of bristles has proven beneficial. Models with angled bristles arranged in a crosswise manner and bundled separate sets of bristles were developed for better cleaning of the tooth interspaces and other harder to reach positions.

The oscillating-rotating rotary toothbrush stands out due to a round rotating or oscillating brush head. The functioning principle is similar to a tooth polishing tool. The cleaning performance of oscillating-rotating brush heads is, according to a study, slightly better than that of manual toothbrushes.

The electronic sonic toothbrush is a development of the electric toothbrush. In the case of the electronic sonic toothbrush, the brush head is moved with a higher frequency than in the case of conventional electric toothbrushes. Instead of a conventional electric motor, the head is driven by means of an electric sonic transducer (magnetically or by means of a piezo effect) and for the most part allows the brush head to oscillate with a frequency of 250 to 300 Hz. The tooth is not cleaned by means of the sound waves as such, but rather only by means of the bristles moving with a relatively high frequency. A special feature in the case of sonic toothbrushes is the oval shape of the brush head thereof, which is reminiscent of a conventional manual toothbrush.

In the case of oscillation frequencies above 300 Hz, one analogously speaks of "ultrasonic toothbrushes". Ultrasonic toothbrushes reach up to 1.8 m oscillations per second (1.8 MHz). Devices of this type operate with a swab which sets the liquid in the mouth oscillating and causes foam bubbles, created with the aid of a special toothpaste, to burst. The cleaning performance is achieved by means of this bursting. Ultrasonic toothpaste does not contain a cleaning particle. Real ultrasonic toothbrushes no longer operate mechanically; they can recognized in that they do not function using conventional toothpaste, as the cleaning particle prevents the mode of action. Although ultrasonic toothbrushes operate, as before, with a brush as an attachment, e.g. a sponge could also be used as a swab. In addition to thorough cleaning, the advantage of the ultrasonic toothbrush is primarily that teeth and gums are not processed mechanically: A longer dwell time on a tooth therefore does not cause damage and the ultrasonic toothbrush can also be used if an implant has been freshly inserted. In the case of ultrasonic toothbrushes, the ultrasonic toothpaste is initially distributed onto the inner and outer surfaces of the teeth with the toothbrush switched off, then the toothbrush is switched on, and the brush head is held for five to ten seconds on the respective inner and outer surface respectively in each case.

It is common to all methods that the actual cleaning of the dentition must take place manually from tooth to tooth successively by the user. Irrespectively of the form which is chosen for the teeth cleaning, the user has to guide a brush head, which only has a size of a few millimetres, over the tooth surfaces successively using various techniques. In this case, a very wide range of instructions are used for formulating the appropriate execution of the cleaning movement (in a circling and stroking manner). Approx. 2.5 to 3 minutes in total are therefore required solely for the cleaning activity, in order to carefully clean a normal human dentition tooth by tooth successively.

U.S. Pat. No. 5,365,624 describes a teeth cleaning device for the simultaneous cleaning of all teeth, which has displaceable and/or rotating brushes, which are set moving using water propulsion, as an important feature. At the same time, the water released is drained again by means of a negative-pressure system and food residues and other substances are discarded in the process.

Using such a teeth cleaning device, the required time period for the cleaning of the dentition can be reduced considerably, as all teeth are essentially cleaned simultaneously. However, fundamentally similar concerns apply for the rinsing with water by means of a supply and drainage line provided in this teeth cleaning device, as in the case of oral irrigators. There is a substantial scientific consensus that in the case of any inflammation present, even inflammation which cannot be seen clinically, the water jet of an oral irrigator may flush the bacteria deeper into the pockets at the gingival margin and worsen inflammation as a result.

SUMMARY OF THE INVENTION

It is therefore the object of the present invention to suggest a teeth cleaning device for the simultaneous cleaning of all teeth, which substantially avoids pushing bacteria into pockets at the gingival margin and in particular does not require water propulsion.

This object is achieved according to the invention by means of a teeth cleaning device for the simultaneous cleaning of a plurality, preferably all of the teeth of a user, comprising:
a) a mouth insert for insertion into the mouth of the user;
b) a plurality of cleaning structures, which are attached to the mouth insert or constructed in one piece with the mouth insert;
c) a coupling element attached to the mouth insert; and d) a drive device, having:
   a vibration motor, which can be connected to the coupling element in such a manner that the vibration motor sets the mouth insert vibrating during the operation of the teeth cleaning device, and
   a cleaning program selection element for selecting a cleaning program, which defines a vibration frequency of the vibration motor within a predetermined frequency range and/or a vibration amplitude of the vibration motor within a predetermined amplitude range.

The teeth cleaning device according to the invention therefore uses a vibration motor, which for reasons of convenience is expediently driven by a battery or rechargeable battery, in order to start the entire mouth insert and therefore also the cleaning structures provided on the mouth insert, which bear against the teeth of the user during operation of the teeth cleaning device, oscillating. Contaminants on the tooth surfaces, i.e. the side surfaces of the teeth, and the masticating surfaces are removed by means of contact with the vibrating cleaning structures. Water propulsion is not required for this, so the problems arising in the prior art are already avoided in principle. In addition, with the aid of the cleaning program selection element, a low vibration frequency can be selected from the predetermined frequency range and/or a low vibration amplitude can be selected from the predetermined amplitude range, so that even mechanical pressing of bacteria into the pockets at the gingival margin, for example, can be prevented or at least reduced by means of a particularly gentle cleaning. Using the teeth cleaning device according to the invention, all teeth of the user can be effectively cleaned simultaneously, so that teeth cleaning is temporally reduced to approx. 10-30 seconds.

Expediently, it is provided here that the predetermined frequency range lies between approximately 1500 and approximately 41,000 oscillations per minute. The user can then choose a vibration frequency at the lower end of this frequency range, in order to carry out a particularly gentle teeth cleaning and avoid pressing bacteria into the pockets at the gingival margin, or a vibration frequency at the upper end of this frequency range for a particularly thorough teeth cleaning.

Preferably, it is provided for this purpose that the cleaning program selection element comprises a frequency adjusting element and/or an amplitude adjusting element which is/are arranged on a housing of the drive device in an accessible manner for the user. These adjusting elements may for example comprise rotary switches or digital buttons, which allow the user to quickly and reliably adjust the frequency and/or amplitude. In principle, an embodiment is also possible, in which a single adjusting element takes on the function of a combined frequency and amplitude adjusting element and enables the user an, if appropriate, infinitely variable adjustment from gentle cleaning at low frequency and amplitude to intensive cleaning at high frequency and amplitude.

In a preferred development of the teeth cleaning device according to the invention, the cleaning program selection element is designed to select at least one predefined cleaning program from a memory of a control circuit of the drive device, which provides a temporal change of the vibration frequency and/or the vibration amplitude of the vibration motor. In this manner, for example, at the start of teeth cleaning, different vibration frequencies or amplitudes can be chosen from at the end of the teeth cleaning.

Expediently, the at least one predefined cleaning program provides a temporal increase of the vibration frequency and/or the vibration amplitude. Then, the teeth cleaning can be begun gently with a low vibration frequency and/or vibration amplitude, and as soon as coarser contaminants for example are removed, the vibration frequency or amplitude can be increased for strengthening the cleaning action.

In this case, the at least one predefined cleaning program expediently provides, after the temporal increase, retaining a maximum vibration frequency and/or vibration amplitude during a predetermined time period, followed by a subsequent reduction of the vibration frequency and/or the vibration amplitude, and/or automatic switching off of the vibration motor.

The cleaning structures, which clean the teeth of the user by means of the vibrating contact thereof with the tooth surfaces and masticating surfaces, may be formed from a multiplicity of materials and configured in different shapes. In particular, it is provided in the case of the teeth cleaning device according to the invention that the cleaning structures comprise:
a) rubber-coating layers, which are attached to surface regions of the mouth insert; and/or
b) cleaning elements, which are constructed in one piece with surface regions of the mouth insert; and/or
c) strip brushes, which are attached to surface regions of the mouth insert.

In an embodiment of the teeth cleaning device according to the invention, which is simple to produce and cost-effective, a single type of cleaning structure can be provided on the entire mouth insert.

By contrast, in an improved embodiment, cleaning structures may be different in the region of masticating surfaces from cleaning structures in the region of tooth surfaces, and/or cleaning structures in the region of tooth surfaces may be different from cleaning surfaces in the region of the gingival margin. This is because the masticating surfaces of the teeth usually have a particularly hard tooth enamel. At the same time, they also come into contact with food and transmitted bacteria more intensively. Due to the high contact pressure during chewing movements, contaminants are pressed deeper into the microfissures of the masticating surfaces. Therefore, the masticating surfaces require and tolerate a more intensive, stronger cleaning activity than the tooth surfaces. Consequently, in the mentioned improved embodiment of the teeth cleaning device according to the invention, relatively hard cleaning elements may be provided in the region of the masticating surfaces for example, which are constructed in one piece with the surface of the mouth insert, whereas softer strip brushes are placed in the region of the tooth surfaces. Likewise, relatively hard diamond-shaped cleaning elements in the region of the masticating surfaces for example, and softer cylindrical cleaning elements in the region of the tooth surfaces may be constructed in one piece with the surface of the mouth insert in each case.

A further difference may be encountered between tooth surfaces and the gingival margin, which is known to be particularly sensitive. For example, cleaning elements may be provided in the region of the tooth surfaces, which are constructed in one piece with surface regions of the mouth insert, whereas the mouth insert carries rubber-coated layers at the gingival margin.

The fastening of such rubber-coated layers or strip brushes on the mouth insert can take place by means of contact adhesives, e.g. cyanoacrylate.

In a simple variant, the mouth insert of the teeth cleaning device according to the invention is constructed in one piece, i.e. it carries the cleaning structures for all teeth of the user.

Alternatively, the mouth insert can be constructed in two pieces, having an upper mouth insert element for the teeth of the upper jaw and a lower mouth insert element for the teeth of the lower jaw, wherein a coupling element for connection to a respective assigned vibration motor is attached to the upper and the lower mouth insert element in each case.

This alternative embodiment can be produced more simply and is additionally advantageous if the cleaning program selection element is designed to select a first predefined cleaning program, for the upper mouth insert element, and a second predefined cleaning program, for the lower mouth insert element, from a memory of a control circuit of the drive device.

This offers the user of the teeth cleaning device according to the invention increased flexibility, if appropriate in consultation with their dentist, during the cleaning of their dentition, as it becomes possible e.g. to clean more powerful teeth of the upper jaw with higher vibration frequency and/or vibration amplitude and therefore more strongly than any more sensitive teeth of the lower jaw or vice versa.

The invention further relates to a method for producing a teeth cleaning device as described above, comprising the steps:
a) scanning the dentition of the user using an intraoral scanner;
b) generating a 3D dentition model from the scan data;
c) creating a design file for the mouth insert on the basis of the 3D dentition model; and
d) producing the mouth insert by means of a 3D printing method.

Preferably, here the step d) comprises selective laser sintering and/or rubber sintering.

Using a conventional intraoral scanner, the dentition situation of the user is digitally detected here and a 3D model is generated form the resultant data. Scanners of this type usually operate with a precision of 5/100 mm, which is sufficient for the invention. Both the hard and the soft tissue are depicted. The digital impression is used as a basis for the computer-assisted design and manufacturing of the mouth insert. The output takes place e.g. in an open STL file.

The transformation of the STL file to a design file for producing the mouth inset takes place in the open digital work flow. CAD software in connection with manipulation software for 3D networks is used as a basis for the work. Although human dentitions and jaws are subject to high variance in terms of form, shape and size, the geometric design of the mouth insert follows a linear algorithm, so that after determining the parameters once, file creation takes place automatically in a few minutes. In this case, parameters such as the wall thickness, outer boundaries and distances can be changed by means of simple operating settings.

The production of the mouth insert preferably takes place in a 3D printing method by means of selective laser sintering. The method is very well-suited for producing large piece numbers cost-effectively. Using an (industry-standard) 3D printer, up to 1,000 cleaning prostheses can be produced within 24 hours.

The mouth insert preferably consists of biocompatible polyamide. Biocompatible polyamide has a broad use spectrum in medicine and is for example used for stents, catheters, implants, etc. Alternatively, thermoplastic elastomers may be processed by means of rubber sintering. Thermoplastic elastomers are plastics, which behave similarly to classical elastomers at room temperature, but can be deformed plastically under the supply of heat and therefore show a thermoplastic behaviour. The material is processed under the supply of heat (laser sintering method) and is also more sensitive to heat than other materials after the processing. In terms of its flexibility, it is only slightly inferior to conventional rubber in terms of flexibility and is otherwise very equal to the same. The material is comparatively lightweight.

In order to achieve an optimum transmission of the kinetic energy of the vibration motor to the mouth insert and therefore an effective cleaning of the teeth, it is provided according to the invention to provide the direct cleaning surfaces of the mouth insert with cleaning structures. Depending on the dentition structure and sensitivity of the user, there are the following options primarily, which can if necessary be combined with one another:

a) Coating by Means of Rubber Coating

During rubber coating, an elastic layer, which consists of caoutchouc (natural or synthetic), is applied on the carrier material and vulcanized with the addition of sulphur. To this end, first the application of the binder takes place by means of painting, spraying, dipping, spreading or lining with rubber plates onto the cleaned and roughened component surface. After drying, this rubber layer is vulcanized in hot air or using saturated steam at approx. 130° C.

b) Configuring a Surface Structure by Means of CAD

The cleaning surfaces can be profiled using a conventional CAD program, in order to create the cleaning elements mentioned thereby. The masticating surfaces can be occupied with diamonds for example. The diameter of a diamond is preferably 0.2 to 0.3 mm. The distance between the side lines of 2 diamonds is preferably 0.2 to 0.3 mm. The distances preferably have a depth of preferably 0.5 to 1 mm.

The tooth surfaces can be occupied with cleaning elements in the form of cylinders. The diameter of a cylinder is preferably 0.2 mm. The distance between the central axes of 2 cylinders is preferably 0.2 to 0.4 mm. The distances preferably have a depth of preferably 0.5 to 1 mm.

c) Attaching Strip Brushes

Strip brushes are filled continuously and can be tailored exactly to the length and width of the cleaning surface. Nylon or fibre are suitable as brush material. They are for example anchored in a milled groove or adhesively bonded onto the surface of the mouth insert.

BRIEF DESCRIPTION OF THE DRAWINGS

Preferred embodiments of the invention are explained in more detail hereinafter on the basis of non-limiting examples, with reference to the attached figures. In the figures.

DETAILED DESCRIPTION OF THE ENABLING EMBODIMENTS

Figure 1:
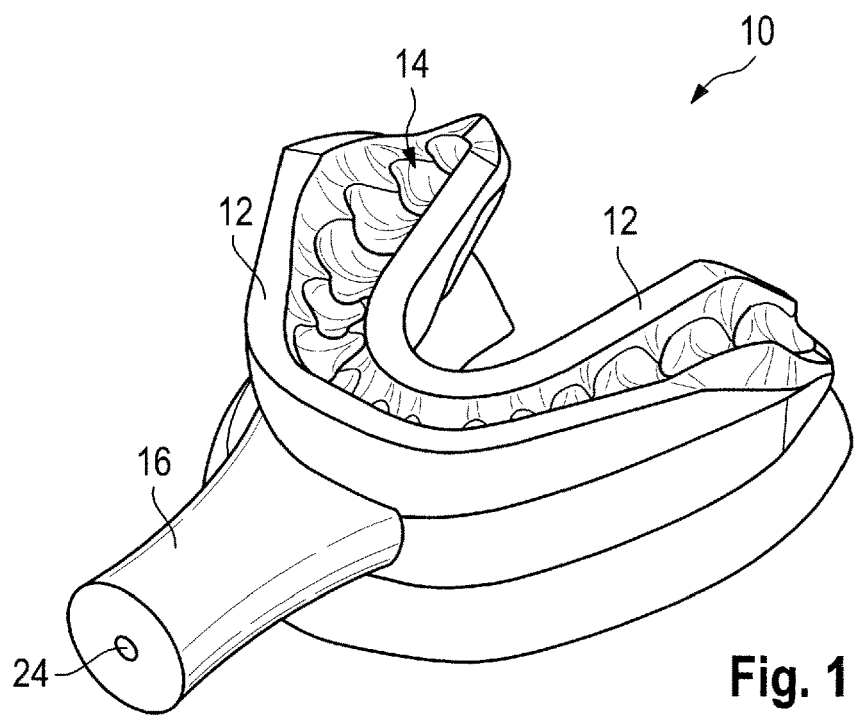
FIG. 1 shows a perspective view of a one-piece mouth insert in a first embodiment of the teeth cleaning device according to the invention.

The FIGS. 1-4 show a first embodiment of the teeth cleaning device according to the invention. FIG. 1 here shows a perspective view of a one-piece mouth insert 10, which is manufactured by means of the method according to the invention on the basis of a 3D dentition model of the user.

The wall thickness of the walls 12 of the mouth insert 10 is typically 1 to 2.5 mm. The outer boundary of the walls 12 generally runs 1 to 3 mm above the gingival margin. The distance between the cleaning surfaces, i.e. the surfaces of the mouth insert 10, on which cleaning structures 14 are provided, and the tooth surfaces is 0 to 5 mm, depending on the chosen cleaning structures 14.

Figure 2:
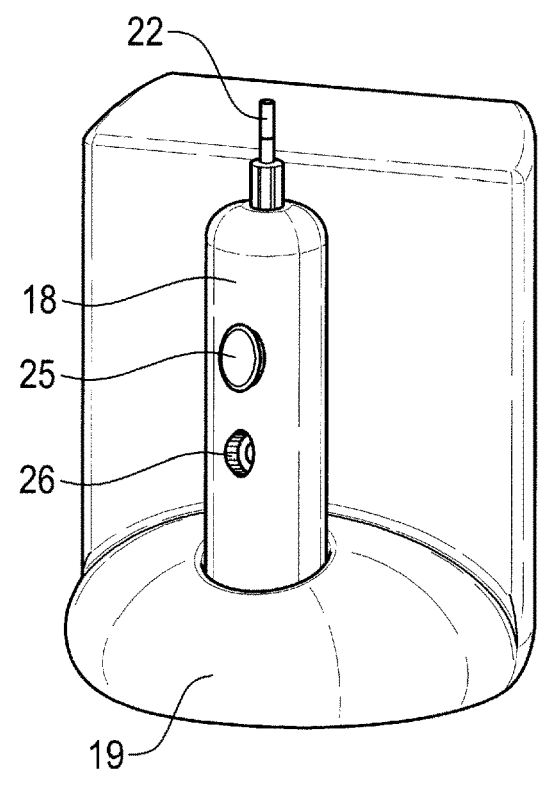
FIG. 2 shows a perspective view of a drive device for connection to the mouth insert from FIG. 1.

A coupling element 16 for connecting the mouth insert 10 to a drive device 18 is attached to the mouth insert 10, which drive device is illustrated schematically in FIG. 2 standing in a holder 19. It is fundamentally comparable to drive devices as are known from the prior art in the field of sonic toothbrushes.

Figure 3:
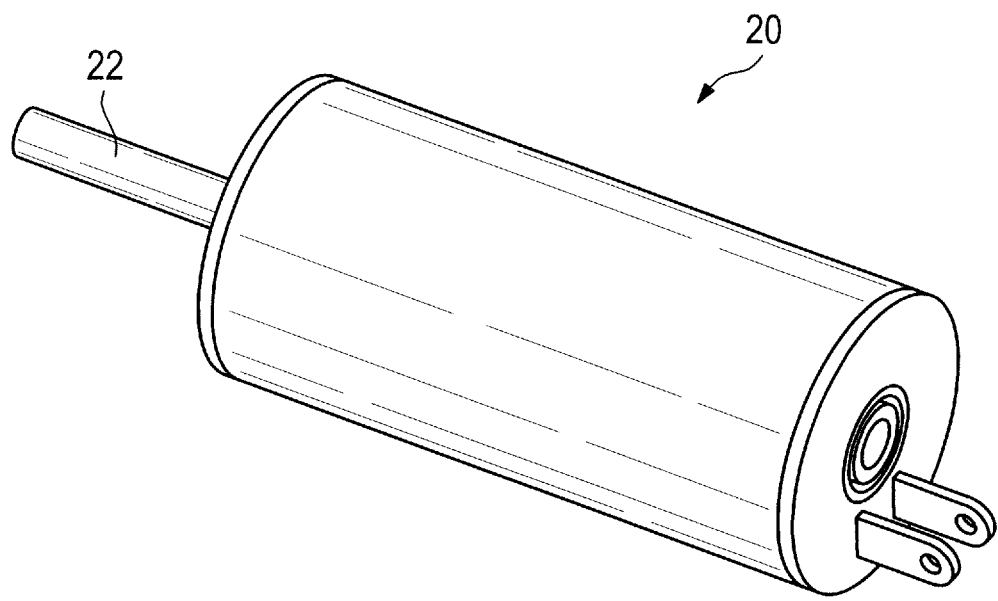
FIG. 3 shows a perspective view of a vibration motor contained in the drive device from FIG. 2.

A vibration motor 20 shown in FIG. 3 is accommodated in a housing of the drive device 18, which vibration motor starts an oscillating shaft 22, protruding out of the housing, vibrating during the operation of the teeth cleaning device according to the invention. For teeth cleaning, the user plugs the oscillating shaft 22 into a fitting hole 24 on the front side of the coupling element 16 and takes the mouth insert 10 into the mouth. As soon as the drive device 18 is switched on by means of an on/off switch 25, the oscillating shaft 22 begins to vibrate. These vibrations are transmitted by means of the coupling element 16 to the mouth insert 10, the cleaning structures 14 of which then vibrate in the mouth of the user on their tooth and masticating surfaces and therefore clean the same.

The vibration frequency can be set by the user with the aid of a cleaning program selection element, which in the case shown in FIG. 2 comprises a rotary switch 26 as a simple frequency adjusting element, which rotary switch is arranged on the housing of the drive device 18 in an accessible manner for the user. Alternatively, instead of a direct selection of the vibration frequency, the rotary switch 26 may also allow a selection between different cleaning programs from a memory of a control circuit of the drive device 18, which differ for example in terms of teeth cleaning duration, the absolute vibration frequency, the temporal course of the vibration frequency with a rise or fall of differing steepness, and other teeth cleaning parameters. Furthermore, a further rotary switch or digital buttons may also be arranged externally on the housing of the drive device 18 for direct selection of the vibration amplitude.

Figure 4:
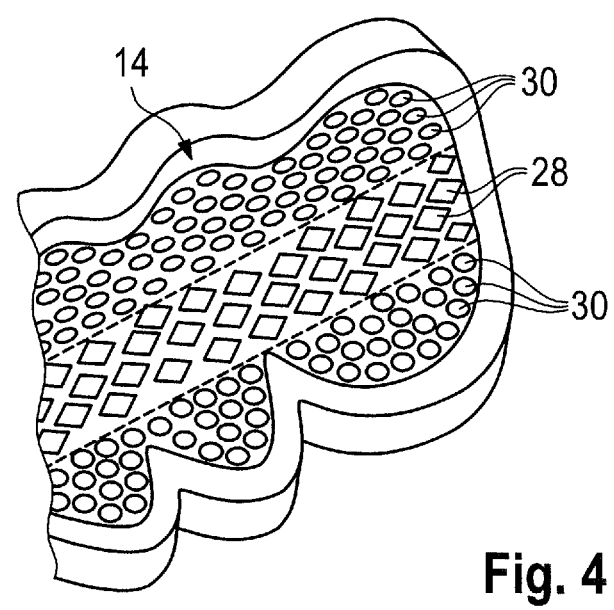
FIG. 4 shows a detail view of cleaning elements on the surface of the mouth insert from FIG. 1.

FIG. 4 shows a detail view of cleaning structures 14 in the form of cleaning elements, which can be provided on the surface of the mouth insert 10 from FIG. 1. In this case, one is concerned in each case with cleaning elements which are formed in one piece with the mouth insert 10 on the surface thereof. In this embodiment, diamond-shaped cleaning elements 28 are provided in the region of the masticating surfaces, cylindrical cleaning elements 30 are provided in the region of the front and rear tooth surfaces in each case. Owing to the diamond shape, the cleaning elements 28 are harder than the cylindrical cleaning elements 30, so that a more intensive teeth cleaning action is achieved in the region of the masticating surfaces. Of course, the cleaning elements 30 can be constructed differently on the front and rear tooth surfaces. Likewise, different cleaning structures 14, for example rubber coating layers and/or strip brushes, could also be provided in each of the regions shown in FIG. 4, i.e. in the region of the rear tooth surfaces, the masticating surfaces and the front tooth surfaces.

Figure 5A:
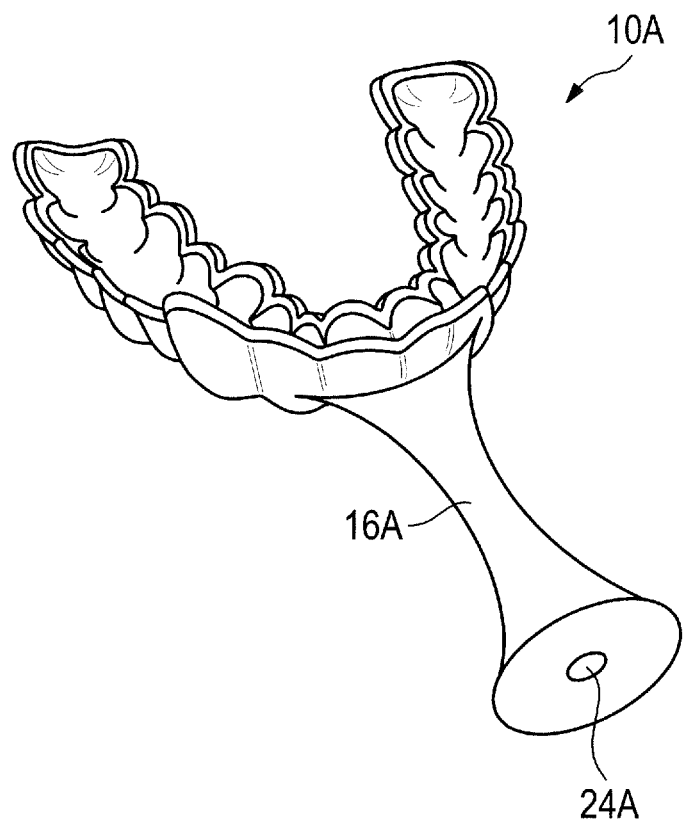
FIG. 5A illustrates an upper mouth insert element for the teeth of the upper jaw.
Figure 5B:
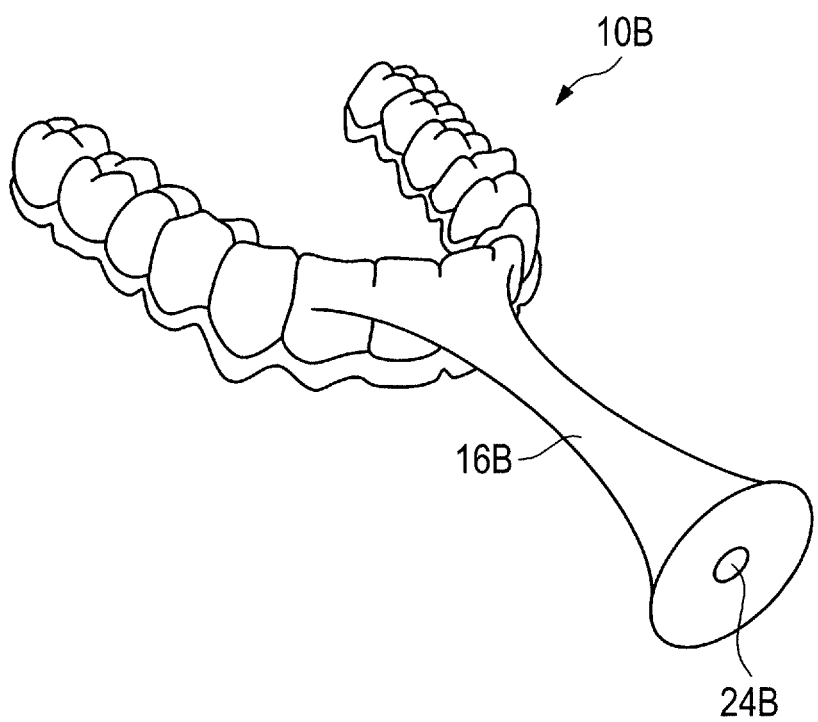
FIG. 5B illustrates a lower mouth insert element for the teeth of the lower jaw.

FIGS. 5A and 5B show a perspective view of a 2-piece mouth insert in a second embodiment of the teeth cleaning device according to the invention, wherein FIG. 5A illustrates an upper mouth insert element 10A for the teeth of the upper jaw and FIG. 5B illustrates a lower mouth insert element 10B for the teeth of the lower jaw.

An upper coupling element 16A with a hole 24A is attached to the upper mouth insert element 10A, a lower coupling element 16B with a hole 24B is attached to the lower mouth insert element 10B.

Figure 6:
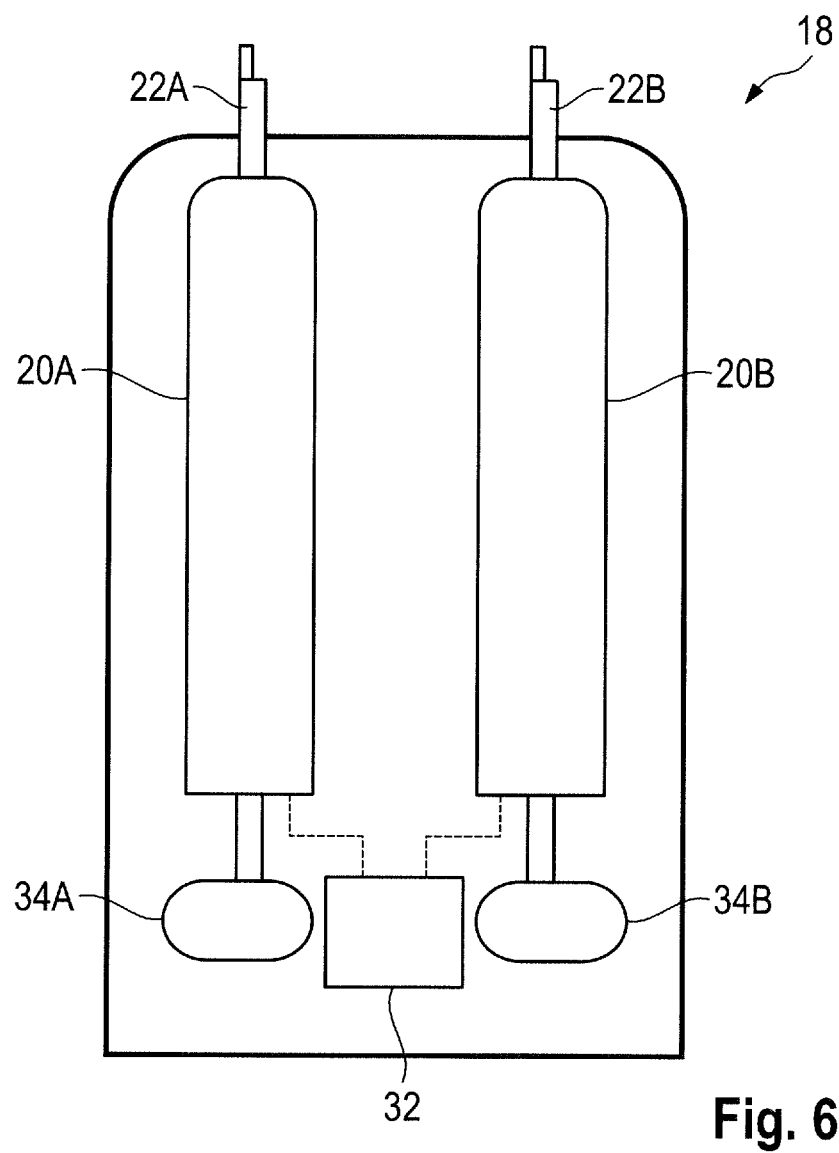
FIG. 6 shows a cross-sectional view of a drive device for connection to the mouth insert from FIG. 5.

FIG. 6 shows a fitting drive device 18 for use with the mouth insert elements 10A, 10B in this second embodiment in a schematic cross section. This drive device 18 comprises two separate vibration motors 20A, 20B, the oscillation forces 22A, 22B of which are in each case to be connected individually to the coupling elements 16A or 16B of the upper mouth insert element 10A or the lower mouth insert element 10B, in that one plugs them into the drives 24A and 24B respectively.

The cleaning program selection element, which cannot be seen in the cross-sectional view of FIG. 6, is designed to select a first predefined cleaning program, for the upper mouth insert element 10A, and a second predefined cleaning program, for the lower mouth insert element 10B, from a memory of an internal control circuit 32 of the drive device 18. This makes it possible, in the event of corresponding medical necessity, to allow the teeth of the upper jaw of the user to be provided with a different teeth cleaning treatment than the teeth of the lower jaw, wherein the different teeth cleaning treatments differ in terms of the vibration frequency and amplitude thereof in particular.

In a simpler variant, one and the same predefined cleaning program can also be stored in the memory of the control circuit 32 for both mouth insert elements 10A, B. In this case, the teeth of the upper jaw and the lower jaw are always cleaned using the same cleaning program, as in the case of the one-piece mouth insert 10 from the first embodiment according to FIG. 1. However, the cleaning structures 14 of the two mouth insert elements 10A, B may also be different from one another so that the upper jaw and the lower jaw of the user can nonetheless be subjected to different teeth cleaning treatment.

In the variant of the second embodiment illustrated in FIG. 6, the two vibration motors 20A, 20B are in each case equipped with an own energy supply in the form of a battery or a rechargeable battery 34A, 34B. Of course, an electronic modification is also possible in that both vibration motors 20A, 20B are supplied by means of a single battery/rechargeable battery.

In a different simplified variant of the second embodiment of the invention, the two mouth insert elements 10A, B can be set vibrating by means of a single drive device 18 with a single vibration motor 20. To this end, it is either necessary that the vibration motor 20 drives two oscillating shafts 22A, 22B protruding from the housing of the drive device 18, or that the vibration motor 20 drives a single oscillating shaft 22 as in the first embodiment of the invention, onto which oscillating shaft an intermediate coupling piece, which is not illustrated in the figures, can be plugged, with an input-side coupling and two output-side couplings, which can be connected to the upper coupling element 16A and the lower coupling element 16B.

In all of the above embodiments, in addition to the direct cleaning action by means of vibrating contact with the tooth and masticating surfaces, the movements of the mouth insert 10, 10A, 10B further ensure a dynamic liquid flow in the mouth of the user. Toothpaste and saliva are gently mixed to give a foaming liquid enriched with oxygen. This is distributed in the entire oral cavity, even behind and between the teeth and along the gingival margin, where the plaque-biofilm-bacteria accumulate. In all of the embodiments, the teeth cleaning device according to the invention is able to remove up to four-times more plaque than a manual toothbrush. At the same time, pressing bacteria into pockets at the gingival margin is substantially prevented.

What is claimed is:

1. A teeth cleaning device for the simultaneous cleaning of a plurality, preferably all of the teeth of a user, comprising:
    a mouth insert for insertion into a mouth of the user;
    a plurality of cleaning structures attached to the mouth insert or constructed in one piece with the mouth insert;
    a coupling element attached to the mouth insert; and
    a drive device having:
        a vibration motor, which can be connected to the coupling element in such a manner that the vibration motor sets the mouth insert vibrating during the operation of the teeth cleaning device, and
        a cleaning program selection element for selecting a cleaning program, which defines a vibration frequency of the vibration motor within a predetermined frequency range and/or a vibration amplitude of the vibration motor within a predetermined amplitude range
    wherein the mouth insert is constructed in two pieces, having an upper mouth insert element for the teeth of the upper jaw and a lower mouth insert element for the teeth of the lower jaw,
    wherein the coupling element includes an upper coupling element attached to the upper mouth insert element and a lower coupling element attached to the lower mouth insert element,
    wherein the vibration motor includes a first vibration motor for operable connection to the upper coupling element and a second vibration motor for operable connection to the lower coupling element; and wherein the cleaning program selection element is designed to select a first predefined cleaning program, for the upper mouth insert element, and a second predefined cleaning program separate from the first predefined cleaning program, for the lower mouth insert element, from a memory of a control circuit of the drive device.

2. The teeth cleaning device according to claim 1, wherein the predetermined frequency range lies between approximately 1500 and approximately 41,000 oscillations per minute.

3. The teeth cleaning device according to claim 1, wherein the cleaning program selection element comprises a frequency adjusting element and/or an amplitude adjusting element which is/are arranged on a housing of the drive device in an accessible manner for the user.

4. The teeth cleaning device according to claim 1, wherein the cleaning program selection element is designed to select at least one predefined cleaning program from a memory of a control circuit of the drive device, which provides a temporal change of the vibration frequency and/or the vibration amplitude of the vibration motor.

5. The teeth cleaning device according to claim 4, wherein at least one predefined cleaning program provides a temporal increase of the vibration frequency and/or the vibration amplitude.

6. The teeth cleaning device according to claim 5, wherein at least one predefined cleaning program provides, after the temporal increase, retaining a maximum vibration frequency and/or vibration amplitude during a predetermined time period, followed by a subsequent reduction of the vibration frequency and/or the vibration amplitude, and/or automatic switching off of the vibration motor.

7. The teeth cleaning device according to claim 1, wherein the plurality of cleaning structures comprise:
    rubber-coating layers, which are attached to surface regions of the mouth insert; and/or
    cleaning elements, which are constructed in one piece with surface regions of the mouth insert; and/or
    strip brushes, which are attached to surface regions of the mouth insert.

8. The teeth cleaning device according to claim 1, wherein the plurality of cleaning structures includes cleaning structures in the region of masticating surfaces being different from cleaning structures in the region of tooth surfaces and/or cleaning structures in the region of tooth surfaces being different from cleaning structures in the region of the gingival margin.

9. A method for producing a teeth cleaning device according to claim 1, comprising the steps of:
    a) scanning a dentition of a user using an intraoral scanner;
    b) generating a 3D dentition model from the scan data;
    c) creating a design file for a mouth insert on the basis of the 3D dentition model; and
    d) producing the mouth insert by means of a 3D printing method.

10. The method according to claim 9, wherein step d) comprises selective laser sintering and/or rubber sintering.

* * * * *